Jan. 15, 1946.

J. BOYD ET AL 2,393,017

BEARING ASSEMBLY

Filed Sept. 15, 1943

WITNESSES:

INVENTORS
John Boyd and
Richard A. Bice.
BY
ATTORNEY

Patented Jan. 15, 1946

2,393,017

UNITED STATES PATENT OFFICE 2,393,017

BEARING ASSEMBLY

John Boyd, Pittsburgh, and Richard A. Bice, Wilkinsburg, Pa., assignors to Westinghouse Electric Corporation, East Pittsburgh, Pa., a corporation of Pennsylvania Application September 15, 1943, Serial No. 502,500

8 Claims. (Cl. 308—238)

This invention relates to bearings and in particular to bearing assemblies of composition bearing material.

Bearing assemblies which utilize bearing staves consolidated from laminated fibrous material impregnated with heat-hardening resinoid are well known in the art. Considerable difficulty has been encountered in utilizing such bearing assemblies because the laminated staves swell when immersed in liquid, such as water, with which they are usually lubricated. When thus swollen, the staves sometimes become distorted to such an extent that the staves seize the shaft that runs in the bearing.

An object of this invention is to compensate for the swelling of composition bearing sleeves in a bearing assembly.

Another object of this invention is to utilize a flexible restraining member for permitting an expansion of composition bearing staves without distortion of the bearing surface pattern.

Figure 1:
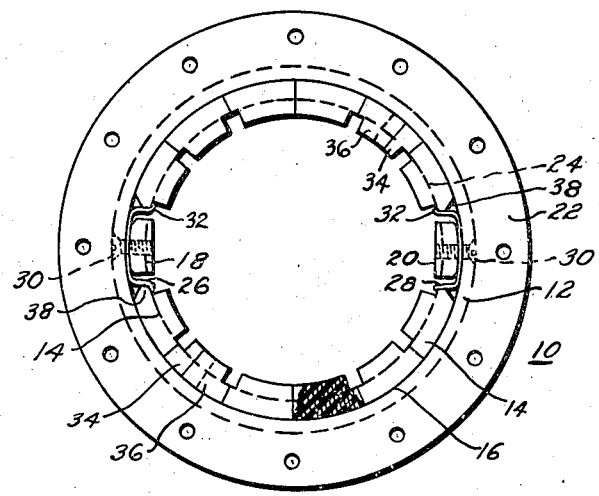
Figure 2:
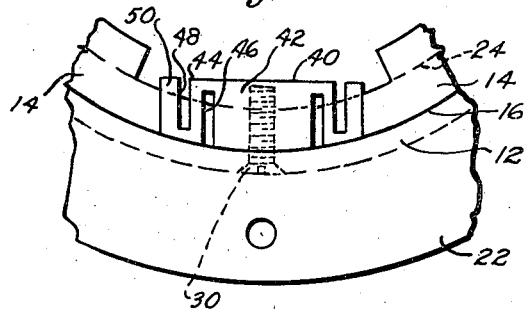

Other objects of this invention will become apparent from the following description, when taken in conjunction with the accompanying drawing, in which:

Figure 1 is a view in elevation and partly in section of a bearing assembly embodying the teachings of this invention; and Fig. 2 is a view in elevation and greatly enlarged of a segment of a bearing assembly illustrating another embodiment of this invention.

Referring to Fig. 1, this invention is illustrated by reference to a bearing assembly 10 comprising a housing 12 of metal or other suitable material and bearing staves 14 disposed to seat in the bore 16 of the housing between keeper strips 18 and 20. The keeper strips 18 and 20 may be of any suitable material, such as metal or laminated fibrous material impregnated with a heat-hardening resinous binder. The keeper strips 18 and 20 are preferably disposed diametrically opposite one another and extend through the length of the housing. End flanges 22 and 24 are carried by the housing to facilitate the mounting and maintenance of the staves and keeper strips therein and to aid in mounting the assembly.

The staves 14 in the embodiment illustrated are preferably divided into two groups disposed to seat on opposite sides of the keeper strips 18 and 20. Each of the staves and the keeper strips are preferably formed of laminated fibrous material, such as duck or other cloth fabrics impregnated with a resinous binder such as a phenolic, urea, vinyl or other resin or resinous mixtures consolidated under heat and pressure into a strong body. Such materials are well known in the art and need not be further described herein, it being apparent that the choice of the fibrous material and the resinous binder used therewith depends upon the characteristics which it is required to develop in the bearing material. Preferably, the staves 14 are so designed that the laminations of the fibrous material extend substantially perpendicular to the base of the stave to present edges at the bearing surface, as illustrated in Fig. 1.

Associated with the keeper strips 18 and 20 are spring members 26 and 28, respectively. Each of the spring members 26 and 28 is substantially U-shaped, being formed of metal such as phosbronze, stainless steel or the like and extend for the length of the associated keeper strip. As illustrated, in mounting the assembly, the keeper strip is disposed to seat on the base of the spring between and spaced from the legs thereof, the keeper strip and associated spring being retained in assembled position by means of screws 30 which extend through the housing and spring into the keeper strip. The springs 26 and 28 are preferably provided with outwardly flared ends 32 which aid in holding the staves 14 in assembled position.

In assembling the bearing assembly, the machined staves are disposed between the springs 26 and 28 for lining the housing, one of the staves 14 in each of the two groups being formed of two wedge-shaped segments 34 and 36 for wedging the staves in assembled position tightly against the legs of the spring members 26 and 28. As illustrated, the end stave 14 of each of the two groups of staves has an edge preferably beveled as at 38 for seating against the leg of the associated spring member 26 or 28, the end of the leg of the spring member being hooked over the edge of the stave to prevent movement thereof outwardly from the bore 16 of the housing.

As illustrated, the legs of the spring members 26 and 28 are disposed to be spaced a slight distance from the sides of the keeper strips 18 and 20, respectively, to provide sufficient room for movement of the flexible spring legs as the staves 14 become swollen when immersed in liquid. Preferably, the distance between the sides of the keeper strips and the legs of the spring members associated therewith, which is shown exaggerated in the drawing, is so slight that as the staves 14 become swollen, the legs of the spring members 26 and 28 are moved into seating engagement with the sides of the keeper strips to provide a rigid stop for the staves. By limiting the distance between the legs of the spring members 26 and 28 and the associated keeper strips 18 and 20, provision is made for preventing the failure of the spring members under the stresses induced therein by the swelling of the staves 14. The flexible nature of the springs 26 and 28 also aids in the assembling of the staves 14 in operative position for lining the housing.

In another embodiment of this invention, as illustrated in Fig. 2, the staves 14 are maintained in operative position for lining the housing 12 by means of a keeper strip 40 which, as in the previous embodiment, is made of any suitable metal and is retained in the housing as by means of the screws 30. In this embodiment the keeper member 40 comprises a main body portion 42 and a convoluted spring portion 44 formed as an integral part of the keeper strip 40. The convolutions 44 may be formed on the keeper strip 40 as by machining the slots 46 and 48 as illustrated on each side of the keeper strip 40. By forming the convolutions 44 so that the outward leg 50 thereof is in a direction extending from the housing, a better spring compliance is obtained so that the convolutions 44 have sufficient flexibility for flexing under the force of the staves 14 as the staves 14 become swollen.

In this embodiment as in the previous case, it is to be noted that the effect of the convolutions is to give under the swelling action of the staves 14 until the end of the outer leg 50 of the convolutions seats against the solid part of the convolution adjacent the main body portion 42 of the keeper strip, the base of the convolutions also moving slightly towards but not necessarily being forced into engagement with the base of the main body portion 42. This, in effect, provides a rigid stop for the staves when the staves are swollen to the degree necessary to flex the convolutions of the keeper strip. As in the previous embodiment, the integral convolutions of the keeper strip 40 also aid in the assembly of the staves in that while being relatively stiff the convolutions flex somewhat under the wedging action of the wedge segments 34 and 36 of one of the staves such as is shown in the embodiment of Fig. 1.

The spring mechanism of this invention associated with the keeper strips is found to have sufficient flexibility to compensate for the swelling of the staves so that as the staves become swollen when immersed in the lubricant the staves move somewhat about the periphery of the bore to the extent of the flexibility of the spring mechanism and up to the point where the spring mechanism is seated against the keeper strip. By permitting the small amount of movement of the staves about the periphery of the bore of the housing, it is found that a substantially uniform bearing pattern of the internal bearing surface is obtained thereby providing a longer life for the bearing assembly. Thus as the bearing staves become swollen, a peripheral movement of the staves is obtained as opposed to the movement obtained prior to this invention in which the staves become so distorted as to effect a buckling of the staves.

Although this invention has been described with reference to a particular embodiment thereof, it is, of course, not to be limited thereto except insofar as is necessitated by the scope of the appended claims.

We claim as our invention:

1. In a bearing, in combination, a housing, a keeper strip carried by the housing, a plurality of staves for lining the housing, each of the staves comprising a strong body consolidated from laminated fibrous material impregnated with heat-hardening resinoid, a relatively stiff spring means associated with the keeper strip disposed to seat against one of the staves, and wedging means disposed to maintain the one of the staves tightly against the spring means and the other staves in position for lining the housing, the spring means having sufficient flexibility to compensate for swelling of the staves.

2. In a bearing, in combination, a housing, a keeper strip carried by the housing, a plurality of relatively long staves seated in edge-to-edge contact adjacent the keeper strip for lining the housing, each of the staves comprising a strong body consolidated from laminated fibrous material impregnated with heat-hardening resinoid, and a relatively stiff spring means associated with the keeper strip disposed to seat against the stave adjacent the keeper strip to maintain the staves in position for lining the housing, the spring means normally maintaining the adjacent stave a slight distance from the keeper strip but being disposed under predetermined conditions to seat against the keeper strip when the staves are swollen.

3. In a bearing, in combination, a housing, a keeper strip carried by the housing, a substantially U-shaped spring member associated with the keeper strip, the keeper strip being disposed to seat on the base of the spring member between and in spaced relation to the legs thereof, a plurality of staves seated for lining the housing, each of the staves comprising a strong body consolidated from laminated fibrous material impregnated with heat-hardening resinoid, one of the staves having an edge in seating engagement with a leg of the spring member, and means for maintaining the stave tightly against the leg of the spring member, the spring member having sufficient flexibility to compensate for swelling of the staves and being disposed under predetermined conditions to seat against the keeper strip to provide a rigid stop for the staves.

4. In a bearing, in combination, a housing, a keeper strip carried by the housing, a relatively stiff spring means carried by the keeper strip, a plurality of staves seated for lining the housing, each of the staves comprising a strong body consolidated from laminated fibrous material impregnated with heat-hardening resinoid, one of the staves having an edge in seating engagement with the spring member, and means for maintaining the stave tightly against the spring member, the spring member having sufficient flexibility to compensate for swelling of the staves while retaining them in position to line the housing.

5. In a bearing, in combination, a housing, a keeper strip carried by the housing, a relatively stiff spring means carried by the keeper strip along an edge thereof, a plurality of relatively long staves seated in edge-to-edge contact for lining the housing, each of the staves comprising a strong body consolidated from laminated fibrous material impregnated with heat-hardening resinoid, one of the staves having an edge in seating engagement throughout its length with the spring member, and means for maintaining the one of the staves tightly against the spring member, the spring member having sufficient flexibility to compensate for swelling of the staves while cooperating with the keeper strip for retaining the staves in position to line the housing.

6. In a bearing, in combination, a housing, a keeper strip carried by the housing, a plurality of staves for lining the housing, each of the staves comprising a strong body consolidated from laminated fibrous material impregnated with heat-hardening resinoid, a pair of the staves being wedge-shaped, and a spring member associated with the keeper strip disposed to seat against one of the staves, the pair of wedge-shaped staves being disposed to cooperate in the assembly of staves to maintain the one of the staves tightly against the spring means and the other staves in position for lining the housing, the spring means having sufficient flexibility to compensate for swelling.

7. In a bearing, in combination, a housing, a keeper strip carried by the housing, the keeper strip having a spring edge portion, a plurality of staves seated for lining the housing, each of the staves comprising a strong body consolidated from laminated fibrous material impregnated with heat-hardening resinoid, one of the staves having an edge in seating engagement with the spring edge portion of the keeper strip, and means for maintaining the one of the staves tightly against the spring edge portion, the spring edge portion of the keeper strip having sufficient flexibility to compensate for swelling of the staves.

8. In a bearing, in combination, a housing, a keeper strip carried by the housing, the keeper strip having a convoluted spring edge portion, the spring edge portion having an outer leg disposed to extend away from the housing, a plurality of staves seated for lining the housing, each of the staves comprising a strong body consolidated from laminated fibrous material impregnated with heat hardening resinoid, one of the staves having an edge in seating engagement with the outer leg of the spring edge portion, and means for maintaining the one of the staves tightly against the outer leg of the spring edge portion, the spring edge portion of the keeper strip having sufficient flexibility to compensate for swelling of the staves.

JOHN BOYD.
RICHARD A. BICE.